United States Patent Office 3,181,974
Patented May 4, 1965

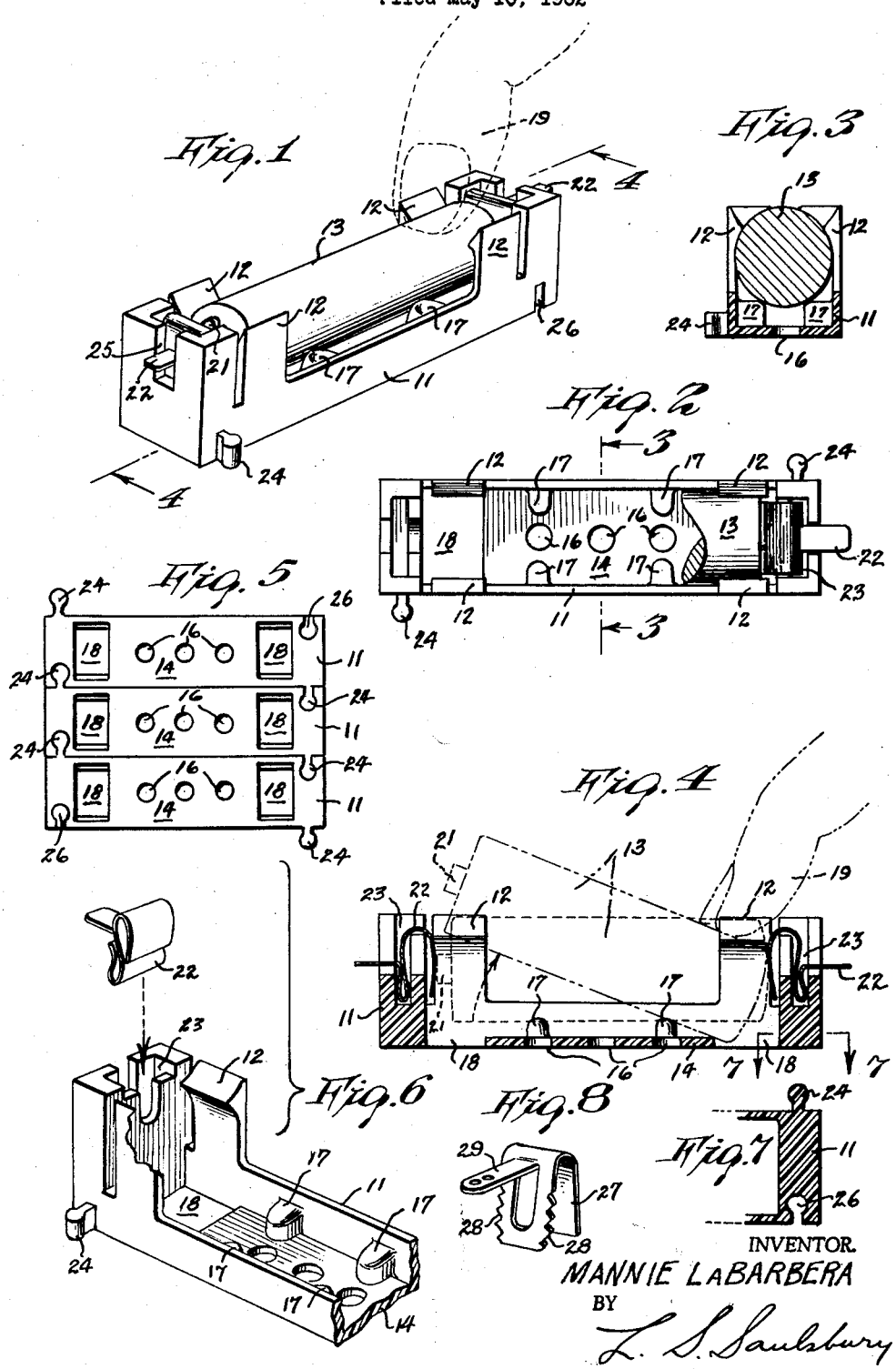
May 4, 1965 — M. LA BARBERA — 3,181,974
RELEASABLE BATTERY CLIP
Filed May 16, 1962
INVENTOR.
MANNIE LaBARBERA
BY
L. S. Saulsbury
ATTORNEY

3,181,974
RELEASABLE BATTERY CLIP
Mannie La Barbera, % La Barb, Inc., Armonk, N.Y.
Filed May 16, 1962, Ser. No. 195,158
1 Claim. (Cl. 136—173)

This invention relates to a novel principle of battery clip design in which a fulcrum is provided to permit the battery to be released by ejection from the clip under straight thrusting finger pressure. This substitution of pushing action for the grasping and pulling action required by conventional battery clips, for battery release, results in a substantial increase in component density, since clearance space does not have to be provided for the fingers to grasp the battery.

In the preferred form of the invention, the entire battery clip, with the exception of the spring terminals, is formed from a unitary longitudinal plastic molding having two alternative fulcrums each located approximately a third of the battery length from each end. In this way, downward finger pressure on either end is reversed by the nearer fulcrum to cause an upward ejection of the battery as it rotates about the operating fulcrum.

A feature of the invention which takes advantage of the lateral space saving afforded by the use of ejection fulcrums is a nesting interlock design which permits many adjacent such congruous molded battery clips to be securely installed with a minimum of hardware and labor.

Another feature is the design of terminal clip which affords fast installation or replacement.

It is the principal object of the present invention to provide a geometry of battery clip construction which will permit the ejection of its battery in response to a digital thrust, thereby obviating the space and digital strength requirements of conventional battery clips.

It is another object of the present invention to provide a battery clip design having the foregoing object and capable of being fabricated from three parts, two of which are identical spring metal clips, and the third of which is a unitary plastic molding.

It is still another object of the present invention to provide a molded plastic design of battery clip which is capable of nesting interlocked side-by-side installation.

It is a further object of the present invention to provide a design of battery terminal clip capable of fast insertion or removal from a mating moulded battery clip holder.

For other objects, and a better understanding of the invention, reference may be had to the following detailed description taken in connection with the accompanying drawings, in which:

FIGURE 1 is a perspective view of the preferred form of the invention showing the position of a finger about to release the battery by ejection, FIG. 2 is a plan view of the battery clip of FIG. 1 with one terminal clip removed and the battery broken away to show the alternative fulcrums, FIG. 3 is a sectional view taken on line 3—3 of FIG. 2, FIG. 4 is a longitudinal section in elevation taken on line 4—4 of FIG. 1, FIG. 5 is a bottom view of a plurality of battery clips in interlocked relation, FIG. 6 is an exploded view in perspective of a portion of the clip showing the assembly of a terminal clip, FIG. 7 is a partial sectional view taken on line 7—7 of FIG. 4, and FIG. 8 is a perspective view of an alternative form of a terminal clip.

Referring to the drawings, 11 is a molded plastic insulating battery holding member having the four integrally formed spring cantilever plastic holding arms 12 which retain a battery 13 when it is snapped into their embrace.

The holding member or chassis 11 has a floor or lower web 14 which is provided with three mounting screw holes 16 any or all of which may be used for securing clip body 11 to an equipment of which the battery clip 11 is a component.

A plurality of fulcrum members 17 are formed integrally with clip body 11 so as to protrude upwardly from the floor web 14 thereby forming both a stop for the inward insertion of the battery 13 and also a pair of fulcrums having axes at right angles to the axis of the battery 13 and to the axis of battery clip 11.

Each holder floor 14 is provided at each end with a well or aperture 18 into which the end of battery 13 may be depressed by rotation about one or the other pair of fulcrum members 17.

In FIGS. 1 and 4, it may be seen that the application of a manual thrust towards clip body 11 by a finger 19 applied at either end of battery 13 will apply a torque about the adjacent pair of fulcrum members 17 which will tend to raise the opposite end of battery 13 so as by cam action to spread apart the remote spring fingers 12 and release the battery 13 from holder 11 by ejecting the end of battery 13 remote from the manually depressed end. Having thus raised one end of the battery 13 above the level of the closely adjacent parallel batteries or any other closely adjacent apparatus, it may be grasped by the thumb and forefinger, due to its elevated accessibility, and the removal completed by a manual tractive withdrawal.

Battery 13 is provided with a contact button or terminal 21 at one end, the exposed body of battery 13 forming the terminal at the other end. An identical spring battery terminal clip 22 is provided at each end of body 11, and is housed in a cavity or well 23 located in each end thereof. Clips 22 are formed of a flexible resilient metal such as beryllium copper and have a serpentine form which frictionally engage the walls of wells 23 so as to retain the clips 22 in body member 11 during battery withdrawal. The outer ends of clips 22 form solder or crimp lugs extending through cutouts 25 in the end walls of the body 11 for connection to a circuit, while the inner ends of clips 22 are adapted to make positive spring loaded contact to the two terminals of battery 13.

Each clip body member 11 is additionally provided at each end with a headed male interlocking tongue member 24 and a female interlocking cavity 26 congruent with member 24. When it is desired to assemble a multiple battery clip, FIG. 5, the members 24 are slid into the adjacent cavities 26 thereby permitting the secure installation of such an assembly with a minimum of screws through mounting holes 16.

In FIG. 8, an alternative form of battery terminal clip 27 having serrated teeth 28 and an integral punched out terminal lug 29 is shown. Teeth 28 are adapted to engage the walls of cavity 23 so as to secure clips 27 to the body 11.

It is evident that while the subject invention has been described as a battery holder, it may equally well be used as a holder for other axial electrical components.

While various changes may be made in the detailed construction, it shall be understood that such changes shall be within the scope and spirit of the present invention as defined by the appended claim.

What is claimed is:

A molded plastic holder for electrical components comprising a longitudinal hollow body having end walls, a first pair of spring cantilever fingers molded integral with said body at one end and adapted to embrace said component at one end, a second pair of spring cantilever fingers molded integral with said body at its other end adapted to embrace said component at its other end, at least one fulcrum member molded integral with said body at a position intermediate between said first and second pairs of spring fingers, a first spring terminal contact having a clip member, and a second spring terminal contact having a clip member, said body having cavities in each end thereof for receiving said first and second spring terminal contacts respectively, and said body having cutouts in the end walls thereof communicating with the cavities for receiving the clip members of said contacts for connection to an electric circuit.

References Cited by the Examiner

UNITED STATES PATENTS

| | | | |
|---|---|---|---|
| 1,439,429 | 12/22 | Lyhne | 136—173 |
| 2,692,944 | 10/54 | Mendelson. | |
| 2,792,934 | 5/57 | Rocchetti | 206—17 |
| 3,000,999 | 9/61 | Schlau | 136—173 |
| 3,089,584 | 5/63 | King | 206—1.8 |

FOREIGN PATENTS

| | | |
|---|---|---|
| 743,215 | 1/56 | Great Britain. |
| 99,129 | 6/40 | Sweden. |

JOHN H. MACK, *Primary Examiner.*